(12) United States Patent
Ishizaki et al.

(10) Patent No.: US 11,740,150 B2
(45) Date of Patent: Aug. 29, 2023

(54) ELECTROSTATIC CAPACITY SENSOR

(71) Applicants: HONDA MOTOR CO., LTD., Tokyo (JP); The University of British Columbia, Vancouver (CA)

(72) Inventors: Ryusuke Ishizaki, Wako (JP); Mirza Saquib Sarwar, Vancouver (CA); John D. W. Madden, Vancouver (CA)

(73) Assignees: Honda Motor Co., Ltd., Tokyo (JP); The University of British Columbia, Vancouver (CA)

( * ) Notice: Subject to any disclaimer, the term of this patent is extended or adjusted under 35 U.S.C. 154(b) by 0 days.

(21) Appl. No.: 17/579,717

(22) Filed: Jan. 20, 2022

(65) Prior Publication Data
US 2022/0228938 A1 Jul. 21, 2022

(30) Foreign Application Priority Data
Jan. 20, 2021 (JP) .................. 2021-006938

(51) Int. Cl.
*G01L 9/00* (2006.01)
*G01L 13/02* (2006.01)
(52) U.S. Cl.
CPC .......... *G01L 9/0073* (2013.01); *G01L 13/026* (2013.01)

(58) Field of Classification Search
None
See application file for complete search history.

(56) References Cited

U.S. PATENT DOCUMENTS

| 7,790,594 | B2* | 9/2010 | Higashi | H01G 5/16 |
| | | | | 257/E23.061 |
| 2012/0017703 | A1* | 1/2012 | Ikebe | G06F 3/0202 |
| | | | | 73/862.626 |
| 2012/0180575 | A1* | 7/2012 | Sakano | G01L 5/165 |
| | | | | 73/862.626 |
| 2017/0024048 | A1* | 1/2017 | Kihara | G01L 1/16 |
| 2022/0034728 | A1* | 2/2022 | Katsuhara | G01L 5/165 |
| 2022/0042866 | A1* | 2/2022 | Mori | G01L 5/165 |

FOREIGN PATENT DOCUMENTS

JP 2019-090729 A 6/2019

* cited by examiner

*Primary Examiner* — Octavia Davis Hollington
*Assistant Examiner* — Jermaine L Jenkins
(74) *Attorney, Agent, or Firm* — Carrier, Shende & Associates P.C.; Joseph P. Carrier; Jeffrey T. Gedeon

(57) ABSTRACT

In an electrostatic capacity sensor 1, first electrodes 11a to 11d are provided on a substrate 10, and an electrode support 14 has dielectric properties and elasticity and is fixed to the substrate 10. A second electrode 12 is provided in the electrode support 14 so as to face the first electrodes 11a to 11d with a distance from the first electrodes 11a to 11d. The electrostatic capacity sensor has improved durability.

7 Claims, 3 Drawing Sheets

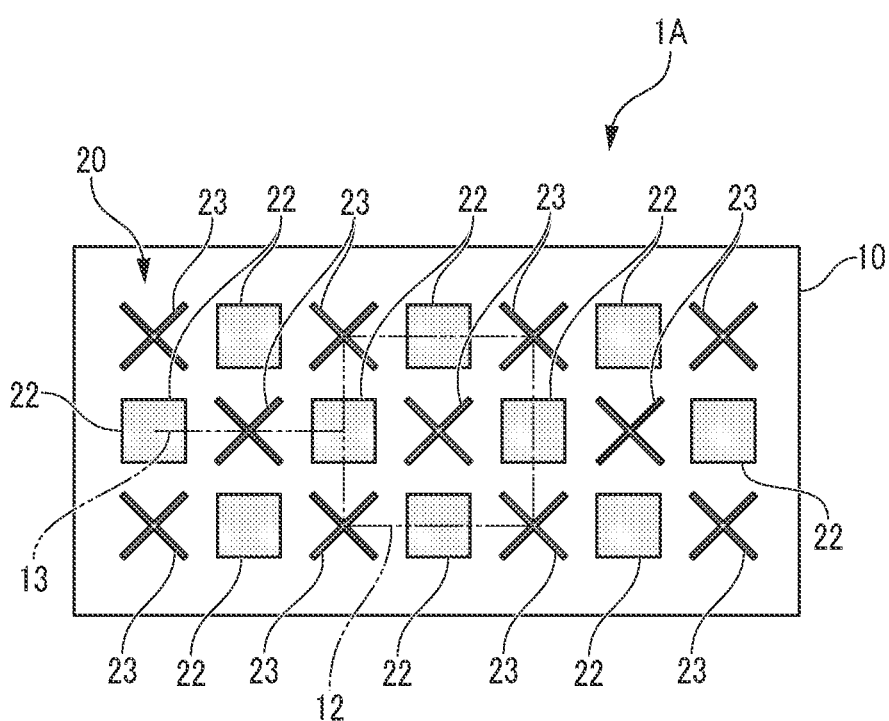

ELECTROSTATIC CAPACITY SENSOR

BACKGROUND

Technical Field

The present invention relates to an electrostatic capacity sensor for detecting a force.

Related Art

Conventionally, an electrostatic capacity sensor described in JP 2019-90729 A is known. The electrostatic capacity sensor is for pressure detection, and includes a flexible substrate with flexibility, a hard substrate, and the like. A first movable electrode, a second movable electrode, and a signal line connected to these movable electrodes are attached to a lower surface of the flexible substrate.

A fixed electrode, an insulating portion, and a metal portion are attached to an upper surface of the hard substrate. The fixed electrode is disposed so as to face the first and the second movable electrodes, and the insulating portion is provided so as to cover an outer peripheral portion of the fixed electrode. Further, the metal portion is formed in an annular shape in a plan view, and is disposed between an upper surface of the insulating portion and a lower surface of the fixed electrode in contact therewith. In the case of this electrostatic capacity sensor, when a pressure acts on an upper side of the first movable electrode in the flexible substrate, the first movable electrode moves toward the fixed electrode, and an electrostatic capacity changes, whereby the pressure is detected.

SUMMARY

By the conventional electrostatic capacity sensor described above, since the two movable electrodes and the signal line are attached to the lower surface of the flexible substrate, when the electrostatic capacity sensor is used for a long period of time in an environment where a pressure repeatedly acts on the flexible substrate, the two movable electrodes and the signal line may be peeled off from the flexible substrate, and there is a problem that durability is low.

The present invention has been made to solve the above problems, and an object thereof is to provide an electrostatic capacity sensor capable of improving durability.

In order to achieve the above object, an electrostatic capacity sensor of the present invention comprises: a substrate; a first electrode that is provided on the substrate; a flexible member that is fixed to the substrate and has dielectric properties and elasticity; and a second electrode that is provided in the flexible member so as to face the first electrode with a distance from the first electrode and is for detecting an electrostatic capacity between the second electrode and the first electrode.

By this electrostatic capacity sensor, the second electrode for detecting an electrostatic capacity between the second electrode and the first electrode is provided in the flexible member so as to face the first electrode with a distance from the first electrode. Therefore, when a force that moves the first electrode toward the second electrode acts on the flexible member, as a distance between the first electrode and the second electrode changes and the electrostatic capacity changes, the force can be detected. At that time, since the second electrode is provided in the flexible member, even when the electrostatic capacity sensor is used for a long time in an environment where the flexible member repeats elastic deformation, the second electrode is not peeled off from the flexible member. Accordingly, durability of the electrostatic capacity sensor can be improved as compared with the case of JP 2019-90729 A.

In the present invention, it is preferred to further include an electric wire that has flexibility, extends in the flexible member, and has one end connected to the second electrode.

By this electrostatic capacity sensor, the electric wire has flexibility, extends in the flexible member, and has one end connected to the second electrode. Therefore, even when the electrostatic capacity sensor is used for a long time in an environment where the flexible member repeats elastic deformation, the electric wire is not peeled off from the flexible member. Accordingly, durability of the electrostatic capacity sensor can be improved as compared with the case of JP 2019-90729 A.

In the present invention, it is preferred that a plurality of first electrodes including a pair of first electrodes be provided on the substrate with a distance from each other in a direction along a surface of the substrate, the first electrodes be connected to a wiring provided on the substrate, and each of the pair of first electrodes be disposed such that a part of a surface facing the second electrode overlaps the second electrode when viewed from a side of the second electrode.

By this electrostatic capacity sensor, the first electrodes including the pair of first electrodes are provided on the substrate with a distance from each other in the direction along the surface of the substrate, and the first electrodes are connected to the wiring provided on the substrate, so that wiring work can be simplified as compared with a case of wiring a plurality of electric wires to the first electrodes, respectively. In addition, each of the pair of first electrodes is disposed such that at least a part of the surface facing the second electrode overlaps the second electrode when viewed from the side of the second electrode. Therefore, when a force acts on the flexible member along a direction in which the pair of first electrodes is disposed, an overlapping area of the surface facing the second electrode changes in each of the pair of first electrodes along with elastic deformation of the flexible member, and an electrostatic capacity changes. As a result, it is possible, based on this change in electrostatic capacity, to detect a force acting in a direction in which the pair of first electrodes is disposed, that is, a shearing force.

In the present invention, it is preferred that the first electrodes further include the other pair of first electrodes, that the other pair of first electrodes be disposed, when viewed from the side of the second electrode, along one of two straight lines orthogonal to each other and with a part of a surface of each of the other pair of first electrodes facing the second electrode, overlapping the second electrode, and that the pair of first electrodes be disposed along the other of the two straight lines when viewed from the side of the second electrode.

By this electrostatic capacity sensor, the first electrodes further include the other pair of first electrodes, and the other pair of first electrodes are disposed such that a part of the surface of each of the other pair of first electrodes, facing the second electrode, overlaps the second electrode when viewed from the side of the second electrode. As such, when a force acts on the flexible member along a direction in which the other pair of first electrodes is disposed, an overlapping area of the surface facing the second electrode changes in each of the other pair of first electrodes along with elastic deformation of the flexible member, and an electrostatic capacity changes. This makes it possible to detect, based on this change in electrostatic capacity, a force acting in the direction in which the other pair of first electrodes is disposed, that is, a shearing force. Further, the other pair of first electrodes is disposed along one of the two straight lines orthogonal to each other, and one pair of first electrodes is disposed along the other of the two straight lines. Therefore, this electrostatic capacity sensor can detect forces in orthogonally triaxial directions.

In the present invention, it is preferred that the flexible member include an electrode built-in unit that builds in the second electrode and has a gap with a surface of the substrate, and a plurality of column portions that extends between the electrode built-in unit and the substrate.

By this electrostatic capacity sensor, the flexible member includes the electrode built-in unit that builds in the second electrode and has a gap with the surface of the substrate, and the column portions that extend between the electrode built-in unit and the substrate. Therefore, when a force acts on the electrode built-in unit, the column portions are elastically deformed, thereby generating a state in which the second electrode and the first electrode change so that a distance therebetween in opposing directions becomes short and a state in which a positional relationship therebetween is shifted in the direction along the surface of the substrate. At this time, the state in which the positional relationship between the second electrode and the first electrode is shifted in the direction along the surface of the substrate is more likely to occur than in a case where the flexible member is solid, which can improve detection sensitivity of a shearing force.

BRIEF DESCRIPTION OF DRAWINGS

FIG. 5 is a cross-sectional view taken along a line II-II in FIG. 4.

DETAILED DESCRIPTION

Figure 1:
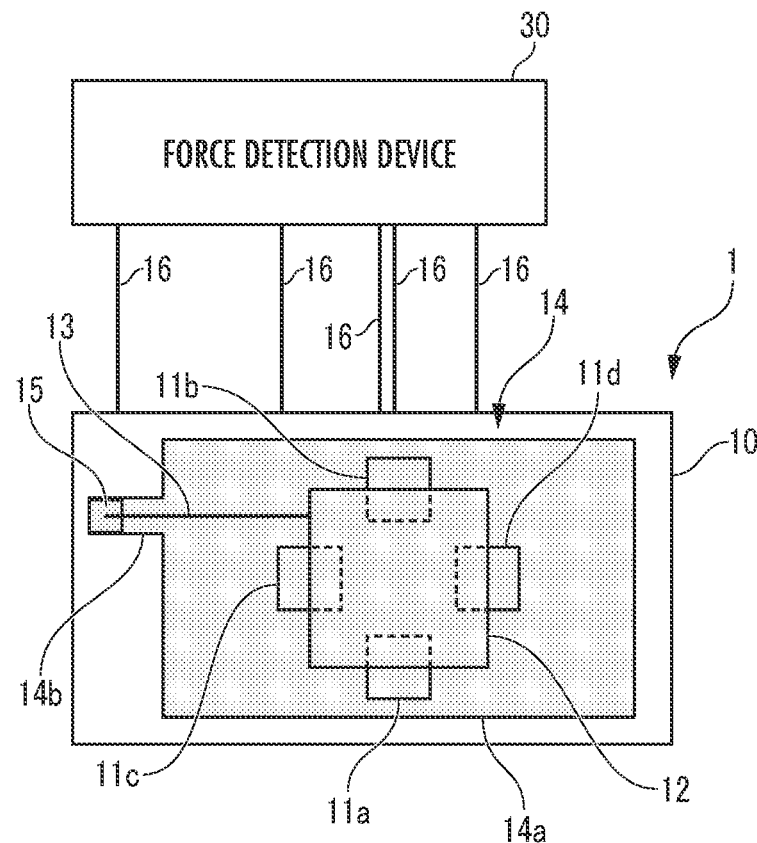
FIG. 1 is a plan view illustrating a configuration of an electrostatic capacity sensor and the like according to a first embodiment of the present invention.

Hereinafter, an electrostatic capacity sensor according to a first embodiment of the present invention will be described with reference to the drawings. As illustrated in FIG. 1, an electrostatic capacity sensor 1 according to the present embodiment is connected to a force detection device 30 via five electric wires 16. As will be described later, the force detection device 30 detects forces in orthogonally triaxial directions acting on the electrostatic capacity sensor 1 based on a detection result of an electrostatic capacity by the electrostatic capacity sensor 1.

Figure 2:
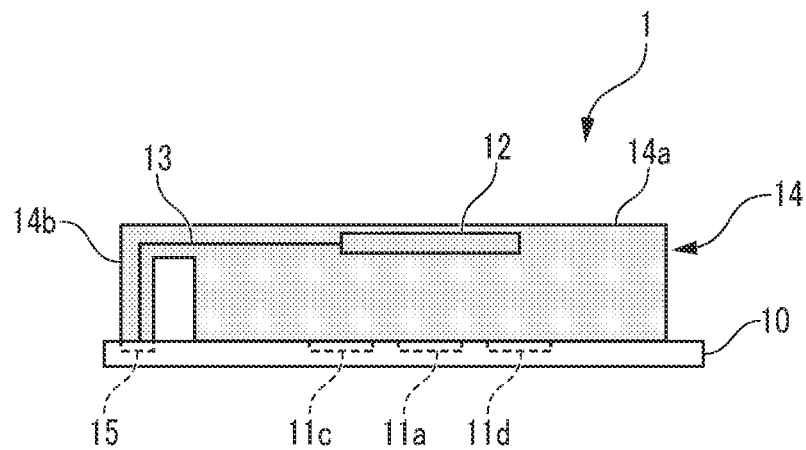
FIG. 2 is a front view of an electrostatic capacity sensor.

As illustrated in FIGS. 1 and 2, the electrostatic capacity sensor 1 according to the present embodiment includes a printed circuit board 10, four first electrodes 11a to 11d, a second electrode 12, an electric wire 13, an electrode support 14, and the like.

Note that, in the following description, for convenience, a left side of FIG. 1 is referred to as "left", a right side of FIG. 1 is referred to as "right", a lower side of FIG. 1 is referred to as "front", an upper side of FIG. 1 is referred to as "rear", a front side of FIG. 1 is referred to as "upper", and a back side of FIG. 1 is referred to as "lower".

The printed circuit board (hereinafter referred to as "substrate") 10 is of a rigid board type having a rectangular shape in a plan view, and has a printed wiring (not illustrated) formed on a surface thereof. The substrate 10 may be formed of a flexible substrate.

The four first electrodes 11a to 11d are disposed, in a plan view, such that a straight line connecting centers of a pair of front and rear first electrodes 11a and 11b is orthogonal to a straight line connecting centers of a pair of left and right first electrodes 11c and 11d, and such that a distance between the centers of the front and the rear first electrodes 11a and 11b and a distance between the centers of the left and the right first electrodes 11c and 11d are identical. In the present embodiment, one of the pair of front and rear first electrodes 11a and 11b and the pair of left and right first electrodes 11c and 11d corresponds to one pair of first electrodes, and the other corresponds to the other pair of first electrodes.

In addition, as illustrated in FIG. 2, the four first electrodes 11a to 11d are in a plate shape and thinner than the substrate 10, are provided flush on an upper surface of the substrate 10, and are connected to the force detection device 30 via the printed wiring of the substrate 10 and the five electric wires 16.

Further, the four first electrodes 11a to 11d are formed into equal-size squares in a plan view, and disposed such that four sides are each parallel to each other. In the following description, each of the four first electrodes 11a to 11d is appropriately referred to as "each first electrode 11".

On the other hand, the electrode support 14 is made of translucent silicon rubber with dielectric properties and elasticity (or flexibility), and is fixed to the upper surface of the substrate 10. The electrode support 14 includes a main body 14a and an electric wire protection portion 14b, and the main body 14a has a solid rectangular parallelepiped shape. The electric wire protection portion 14b is formed in a columnar shape having a rectangular cross-section, extends leftward from the main body 14a, and then bends at a right angle to extend to the substrate 10. In the present embodiment, the electrode support 14 corresponds to a flexible member.

The second electrode 12 is of a plate-shaped flexible electrode type with flexibility, and is formed in a square shape in a plan view. The second electrode 12 is, in a plan view, disposed such that each of the four sides is parallel to each of the four sides of each first electrode 11, and such that a half of a surface of each first electrode 11 overlaps the second electrode 12. The second electrode 12 is built in the main body 14a, held in a posture parallel to the substrate 10 and entirely in close contact with the main body 14a.

Furthermore, the electric wire 13 is of a flexible electric wire type with flexibility, extends leftward from the second electrode 12 inside the main body 14a and the electric wire protection portion 14b of the electrode support 14, then bends downward at a right angle to extend inside the electric wire protection portion 14b, and has a distal end portion thereof connected to a terminal 15. This terminal 15 is connected to the printed wiring of the substrate 10, so that the second electrode 12 is connected to the force detection device 30 via the electric wire 13, the terminal 15, the printed wiring, and the electric wire 16.

On the other hand, the force detection device 30 combines a microcomputer and an electric circuit. In the force detection device 30, by applying a voltage between each first electrode 11 and the second electrode 12, an electrostatic capacity between each first electrode 11 and the second electrode 12 is detected.

Then, based on these four electrostatic capacities, a force (load) acting downward, a shearing force acting in a left-right direction, and a shearing force acting in a front-rear direction on the electrostatic capacity sensor 1 are calculated by an arithmetic expression (not illustrated). In brief, the electrostatic capacity sensor 1 according to the present embodiment has a function as a triaxial force sensor.

As described above, by the electrostatic capacity sensor 1 according to the first embodiment, the second electrode 12 is provided in the electrode support 14 so as to face each first electrode 11 with a distance from each first electrode 11. Thus, when a downward force (load) acts on the electrode support 14, a distance between each first electrode 11 and the second electrode 12 changes, and as an electrostatic capacity changes, the force can be detected. At this time, since the second electrode 12 is built in the electrode support 14, a short circuit between each first electrode 11 and the second electrode 12 can be avoided, and even when the electrostatic capacity sensor 1 is used for a long time under an environment where the electrode support 14 repeats elastic deformation, the second electrode 12 is not peeled off from the electrode support 14. Accordingly, as compared with the case of JP 2019-90729 A, durability of the electrostatic capacity sensor 1 can be improved.

In addition, since the four first electrodes 11a to 11d are connected to the printed wiring provided on the substrate 10, wiring work can be simplified as compared with a case where four electric wires are respectively wired to the four first electrodes 11a to 11d. Further, the four first electrodes 11a to 11d are, in a plan view, disposed such that the straight line connecting the centers of the pair of front and rear first electrodes 11a and 11b is orthogonal to the straight line connecting the centers of the pair of left and right first electrodes 11c and 11d, and such that a half of the surface of each first electrode 11 overlaps the second electrode 12.

Thus, when a force in orthogonally biaxial directions along the surface of the substrate 10, that is, a shearing force acts on the electrode support 14, as the electrode support 14 is elastically deformed, an overlapping area of surfaces facing each other between each first electrode 11 and the second electrode 12 changes, and an electrostatic capacity changes. This makes it possible to detect the shearing force in the orthogonally biaxial directions based on these changes in electrostatic capacity. As described above, the electrostatic capacity sensor 1 can be used to detect forces in orthogonally triaxial directions.

In the first embodiment, the entire second electrode 12 is built in the electrode support 14, but alternatively, a part of the second electrode 12 may be exposed outward from the electrode support 14. In this case, it is only necessary that the second electrode 12 be not short-circuited with the first electrode 11 when the electrode support 14 is elastically deformed.

In addition, in the electrostatic capacity sensor 1 according to the first embodiment, a shield may be provided on an upper side of the second electrode 12 in the electrode support 14, and a third electrode for detecting approach of an object may be further provided on an upper side of the shield. With such a configuration, in addition to a function as a triaxial force sensor, a function as a proximity sensor can be secured.

Further, the first embodiment is an example in which the electrode support 14 made of silicon rubber is used as a flexible member, but the flexible member of the present invention is not limited thereto, and any member may be used as long as it has dielectric properties and elasticity. For example, as a flexible member, a dielectric such as a conductive resin such as a thiophene-based conductive polymer or PSS, PVC gel, polyvinylidene fluoride (PVDF), polydimethylsiloxane (PDMS), a silicon-based resin, an urethane-based resin, or an epoxy-based resin, or a composite material of any combination thereof may be used.

The first embodiment is also an example in which the rectangular parallelepiped electrode support 14 is used as a flexible member, but alternatively, flexible members having various shapes such as an oval shape, a cylindrical shape, and a hemispherical shape may be used.

On the other hand, the first embodiment is an example in which a square shape in a plan view is used for the four first electrodes 11a to 11d, but alternatively, a rectangular shape other than a square shape in a plan view may be used for the four first electrodes 11a to 11d, and any shape may be used as long as it has symmetry in a plan view.

Further, the first embodiment is an example in which a square shape in a plan view is used for the second electrode 12, but alternatively, a rectangular shape other than a square shape in a plan view may be used for the second electrode 12, and any shape may be used as long as it has symmetry in a plan view.

Furthermore, the first embodiment is an example in which the electrostatic capacity sensor 1 includes the pair of front and rear first electrodes 11a and 11b and the pair of left and right first electrodes 11c and 11d, but alternatively, the electrostatic capacity sensor 1 may include one of the pair of front and rear first electrodes 11a and 11b and the pair of left and right first electrodes 11c and 11d, or may include one first electrode 11.

On the other hand, the first embodiment is an example in which the electric wire 13 extends in the main body 14a of the electrode support 14, but alternatively, the electric wire 13 may extend outside the main body 14a of the electrode support 14.

Hereinafter, an electrostatic capacity sensor 1A according to a second embodiment of the present invention will be described with reference to FIGS. 3 to 5. The electrostatic capacity sensor 1A according to the present embodiment is different from the electrostatic capacity sensor 1 according to the first embodiment in that an electrode support 20 is provided instead of the electrode support 14, and thus the electrode support 20 will be mainly described below.

Configurations identical to ones according to the first embodiment are denoted by identical reference signs, and descriptions thereof will be omitted. In FIG. 3, the force detection device 30 and the like illustrated in FIG. 1 are omitted.

Figure 3:
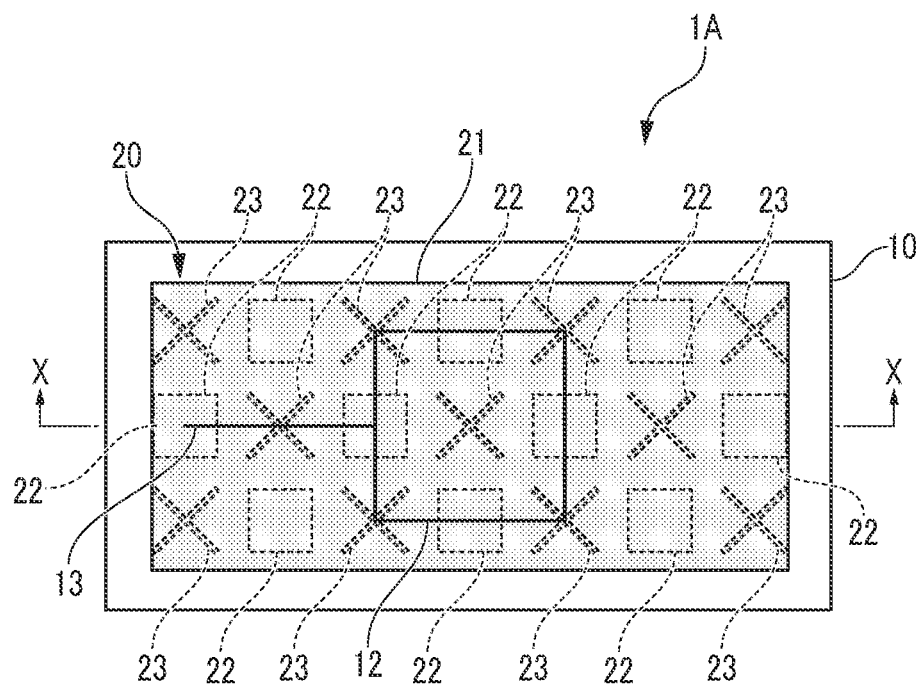
FIG. 3 is a plan view illustrating a configuration of an electrostatic capacity sensor according to a second embodiment.
Figure 4:
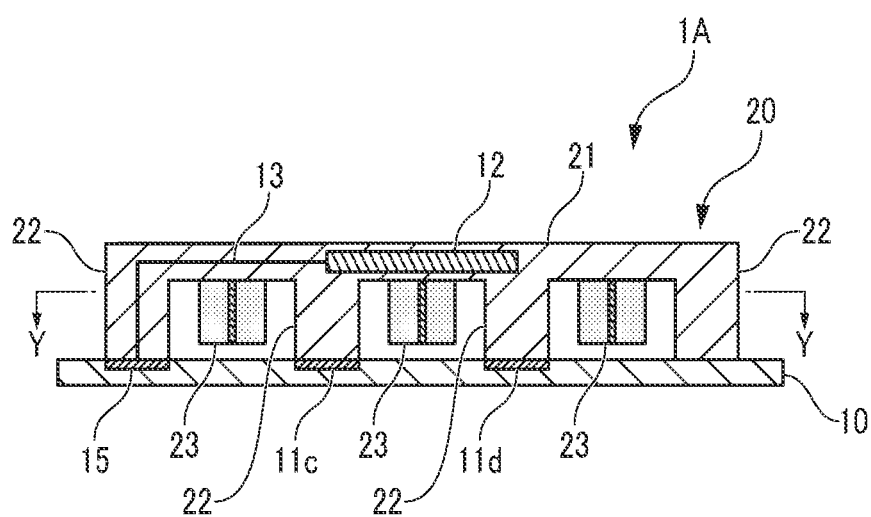
FIG. 4 is a cross-sectional view taken along a line I-I in FIG. 3.

The electrostatic capacity sensor 1A according to the present embodiment includes the electrode support 20 illustrated in FIGS. 3 to 5, and the electrode support 20 is, similarly to the electrode support 14 according to the first embodiment, made of translucent silicon rubber. The electrode support 20 has a hollow shape (see FIG. 4), and includes an electrode built-in unit 21, 10 first column portions 22, 11 second column portions 23, and the like. In the present embodiment, the electrode support 20 corresponds to a flexible member.

The electrode built-in unit 21 is formed in a thin plate shape having a rectangular shape in a plan view, is provided in parallel to the substrate 10, and is thicker than the second electrode 12 in a vertical direction. The second electrode 12 is located in a central portion of the electrode built-in unit 21 in a plan view, and is built in the electrode built-in unit 21 in a posture parallel to the substrate 10 and in a state of not being exposed to the outside.

As illustrated in FIGS. 3 and 5, the 10 first column portions 22 each and the 11 second column portions 23 each are disposed alternately in the left-right direction and the front-rear direction at an equal distance. Each of the first column portions 22 has a rectangular cross-sectional shape in a plan view (see FIG. 5), and a size thereof is set to be identical to one of the first electrode 11 in a plan view. Each of the first column portions 22 integrally extends downward from the electrode built-in unit 21, and a distal end portion thereof is fixed to the substrate 10.

As illustrated in FIG. 3, when the electrode support 20 is viewed in a plan view, the four first column portions 22 are disposed in a cross shape at positions equidistant from a center of the electrode support 20. Of these four first column portions 22, two first column portions 22 and 22 on inner sides are provided at positions corresponding to the left and the right first electrodes 11c and 11d, and are fixed to the first electrode 11 in a state where distal end portions thereof cover surfaces of the left and the right first electrodes 11c and 11d (see FIG. 4).

In addition, the remaining two first column portions 22 and 22 are provided at positions corresponding to the two first electrodes 11a and 11b disposed in the front-rear direction through a center of the substrate 10, and are fixed to the first electrode 11 in a state where distal end portions thereof cover surfaces of the two first electrodes 11a and 11b.

Further, the electric wire 13 extends leftward from the second electrode 12 through the electrode built-in unit 21, then bends downward, and extends to the substrate 10 through the first column portion 22 at a left end.

On the other hand, each of the 11 second column portions 23 has a cross section in an "x" shape in a plan view, integrally extends downward from the electrode built-in unit 21, and is provided such that a distal end portion thereof has a predetermined distance from the surface of the substrate 10. With the above configuration, when a downward load (force) acts on the electrode support 20 and some of the second column portions 23 abut on the substrate 10 as the electrode built-in unit 21 bends toward the substrate 10, the load is supported by these second column portions 23. That suppresses a degree of elastic deformation of the electrode support 20 thereafter. In other words, excessive elastic deformation of the electrode support 20 can be avoided.

As described above, the electrostatic capacity sensor 1A according to the second embodiment can detect forces in orthogonally triaxial directions, similarly to the electrostatic capacity sensor 1 according to the first embodiment. Furthermore, even when the electrostatic capacity sensor 1A is used for a long time under an environment where the electrode support 20 repeats elastic deformation, the second electrode 12 is not peeled off from the electrode support 20, and thus durability of the electrostatic capacity sensor 1A can be improved as compared with the case of JP 2019-90729 A.

In addition, since the electrode support 20 has the electrode built-in unit 21 and the 10 first column portions 22 extending between the electrode built-in unit 21 and the substrate 10, when a force acts on the electrode built-in unit 21, the 10 first column portions 22 are elastically deformed, so that a positional relationship between the second electrode 12 and the each first electrode 11 is easily shifted in a direction along the surface of the substrate 10, and this state is more likely to be generated than the electrode support 14 according to the first embodiment. Thus, this electrostatic capacity sensor 1A can improve detection sensitivity of a shearing force as compared with the electrostatic capacity sensor 1 according to the first embodiment.

Although the second embodiment is an example in which the electrode support 20 is used as a flexible member, the flexible member of the present invention is not limited thereto, and any member may be used as long as it has dielectric properties and elasticity. As the electrode support 20, one that has the first column portion 22 having a cross-sectional shape other than a square shape (for example, a circular or a regular polygonal cross-sectional shape) may be used.

Furthermore, the number of the first column portions 22 of the electrode support 20 is not limited to 10, and any number may be used as long as it is plural. The number of the second column portions 23 of the electrode support 20 is not limited to 11, any number may be used as long as it is equal to or greater than one, and the second column portions 23 may be omitted. Further, the second column portion 23 is not limited to one having a cross section of the "x" shape in a plan view, and one having a polygonal or a circular cross section in a plan view may be used.

On the other hand, in the second embodiment, the second electrode 12 is entirely built in the electrode built-in unit 21 of the electrode support 20, but alternatively, a part of the second electrode 12 may be exposed outward from the electrode built-in unit 21. In this case, it is only necessary that the second electrode 12 be not short-circuited with the first electrode 11 when the electrode support 20 is elastically deformed.

In addition, the second embodiment is an example in which the electrode support 20 made of silicon rubber is used as a flexible member, but the flexible member of the present invention is not limited thereto, and any member may be used as long as it has dielectric properties and elasticity. For example, as a flexible member, a dielectric such as a conductive resin such as a thiophene-based conductive polymer or PSS, PVC gel, polyvinylidene fluoride (PVDF), polydimethylsiloxane (PDMS), a silicon-based resin, an urethane-based resin, or an epoxy-based resin, or a composite material of any combination thereof may be used.

Furthermore, the second embodiment is an example in which the electrostatic capacity sensor 1A includes the pair of front and rear first electrodes 11a and 11b and the pair of left and right first electrodes 11c and 11d, but alternatively, the electrostatic capacity sensor 1A may include one of the pair of front and rear first electrodes 11a and 11b and the pair of left and right first electrodes 11c and 11d, or may include one first electrode 11.

REFERENCE SIGNS LIST 1 electrostatic capacity sensor
10 printed circuit board (substrate)
11a first electrode
11b first electrode
11c first electrode
11d first electrode
12 second electrode
13 electric wire
14 electrode support (flexible member)
1A electrostatic capacity sensor
20 electrode support (flexible member)
21 electrode built-in unit
22 first column portion (a plurality of column portions)

What is claimed is:

1. An electrostatic capacity sensor comprising:
a substrate;
a first electrode that is provided on the substrate;
a flexible member that is fixed to the substrate and has dielectric properties and elasticity; and
a second electrode that is provided in the flexible member so as to face the first electrode with a distance from the first electrode, and is for detecting an electrostatic capacity between the second electrode and the first electrode, wherein
a plurality of the first electrodes including a pair of first electrodes is provided on the substrate with a distance from each other in a direction along a surface of the substrate, and the first electrodes are connected to a wiring provided on the substrate, and
each of the pair of first electrodes is disposed, when viewed from a side of the second electrode, such that a part of a surface facing the second electrode overlaps the second electrode.

2. The electrostatic capacity sensor according to claim 1, further comprising
an electric wire that has flexibility, extends in the flexible member, and has one end connected to the second electrode.

3. The electrostatic capacity sensor according to claim 2, wherein the flexible member includes an electrode built-in unit that builds in the second electrode and has a gap with a surface of the substrate, and a plurality of column portions that extends between the electrode built-in unit and the substrate.

4. The electrostatic capacity sensor according to claim 1, wherein
the first electrodes further include the other pair of first electrodes,
the other pair of first electrodes is disposed, when viewed from the side of the second electrode, along one of two straight lines orthogonal to each other and such that a part of a surface of each of the other pair of first electrodes, facing the second electrode, overlaps the second electrode, and
the pair of first electrodes is disposed, when viewed from the side of the second electrode, along the other of the two straight lines.

5. The electrostatic capacity sensor according to claim 4, wherein
the flexible member includes an electrode built-in unit that builds in the second electrode and has a gap with the surface of the substrate, and a plurality of column portions that extends between the electrode built-in unit and the substrate.

6. The electrostatic capacity sensor according to claim 1, wherein
the flexible member includes an electrode built-in unit that builds in the second electrode and has a gap with a surface of the substrate, and a plurality of column portions that extends between the electrode built-in unit and the substrate.

7. The electrostatic capacity sensor according to claim 6, wherein
the flexible member includes an electrode built-in unit that builds in the second electrode and has a gap with the surface of the substrate, and a plurality of column portions that extends between the electrode built-in unit and the substrate.

* * * * *